United States Patent
Hasegawa et al.

(10) Patent No.: US 10,566,625 B2
(45) Date of Patent: Feb. 18, 2020

(54) ELECTRODE ACTIVE MATERIAL, ELECTRODE FOR ELECTRICITY STORAGE DEVICE, ELECTRICITY STORAGE DEVICE, AND METHOD FOR PRODUCING ELECTRODE ACTIVE MATERIAL

(71) Applicant: KABUSHIKI KAISHA TOYOTA CHUO KENKYUSHO, Nagakute-shi, Aichi-ken (JP)

(72) Inventors: Masaki Hasegawa, Nagakute (JP); Nobuhiro Ogihara, Nagakute (JP)

(73) Assignee: KABUSHIKI KAISHA TOYOTA CHUO KENKYUSHO, Nagakute-shi (JP)

( * ) Notice: Subject to any disclaimer, the term of this patent is extended or adjusted under 35 U.S.C. 154(b) by 149 days.

(21) Appl. No.: 15/884,925

(22) Filed: Jan. 31, 2018

(65) Prior Publication Data

US 2018/0287157 A1 Oct. 4, 2018

(30) Foreign Application Priority Data

Mar. 28, 2017 (JP) .................. 2017-062814

(51) Int. Cl.
*H01M 4/60* (2006.01)
*H01M 4/62* (2006.01)
*H01M 10/00* (2006.01)
*H01M 4/04* (2006.01)
*H01M 4/13* (2010.01)
*H01M 4/02* (2006.01)
(Continued)

(52) U.S. Cl.
CPC ............... *H01M 4/60* (2013.01); *H01M 4/04* (2013.01); *H01M 4/13* (2013.01); *H01M 4/624* (2013.01); *H01M 10/00* (2013.01); *H01M 10/054* (2013.01); *H01M 10/0525* (2013.01); *H01M 12/005* (2013.01); *H01M 2004/021* (2013.01); *H01M 2004/027* (2013.01)

(58) Field of Classification Search
CPC ............ H01M 4/60; H01M 4/04; H01M 4/13; H01M 4/624; H01M 10/00; H01M 10/0525; H01M 10/054
See application file for complete search history.

(56) References Cited

U.S. PATENT DOCUMENTS

2010/0330423 A1* 12/2010 Cui .................. H01M 4/38
429/220
2012/0258360 A1 10/2012 Ogihara
2015/0064557 A1 3/2015 Kim et al.

FOREIGN PATENT DOCUMENTS

JP 2003-173777 A 6/2003
JP 2005-093192 A 4/2005
(Continued)

OTHER PUBLICATIONS

May 21, 2019 Office Action issued in Japanese Patent Applicaiton No. 2017-62814.

*Primary Examiner* — Jimmy Vo
(74) *Attorney, Agent, or Firm* — Oliff PLC

(57) ABSTRACT

An electricity storage device 20 includes a positive electrode 22, a negative electrode 23 containing a layered structure of an aromatic dicarboxylic acid metal salt as an electrode active material, and an ion conducting medium 27 capable of conducting carrier ions. The layered structure is formed by spray-drying a solution prepared by containing aromatic dicarboxylic acid anions and alkali metal cations by using a spray-drying apparatus.

14 Claims, 13 Drawing Sheets

(51) Int. Cl.
   *H01M 12/00* (2006.01)
   *H01M 10/0525* (2010.01)
   *H01M 10/054* (2010.01)

(56) References Cited

FOREIGN PATENT DOCUMENTS

| | | |
|---|---|---|
| JP | 2005-135925 A | 5/2005 |
| JP | 2012-221754 A | 11/2012 |
| JP | 2013-055000 A | 3/2013 |
| JP | 2013-235682 A | 11/2013 |
| JP | 2015-536026 A | 12/2015 |

\* cited by examiner

Example 1

Comparative example 1

Examples 1 and 5

Examples 2 and 6

Examples 3 and 7

Examples 4 and 8

Comparative example 1

Example 1

Example 2

Comparative Example 1

—— 10 um

ELECTRODE ACTIVE MATERIAL, ELECTRODE FOR ELECTRICITY STORAGE DEVICE, ELECTRICITY STORAGE DEVICE, AND METHOD FOR PRODUCING ELECTRODE ACTIVE MATERIAL

BACKGROUND OF THE INVENTION

1. Field of the Invention

The invention disclosed herein relates to an electrode active material, an electrode for an electricity storage device, an electricity storage device, and a method for producing the electrode active material.

2. Description of the Related Art

One of the known electricity storage devices such as lithium ion secondary batteries uses a layered structure as a negative electrode active material. The layered structure includes an organic framework layer containing an aromatic compound having two or more aromatic ring structures in the form of dicarboxylic acid anions, and an alkali metal element layer containing alkali metal element coordinated by oxygen atoms of the carboxylic acid anions to form a framework (for example, PTL 1). The layered structure used as a negative electrode active material is not electrically conductive, but is poorly soluble in non-aqueous electrolyte and can maintain the crystal structure, being advantageous for enhancing the stability of charge-discharge cycle characteristics. In manufacture of known lithium secondary batteries or the like, an active material is mixed with an electrically conductive material and a binder, and the mixture is spray-dried to form particles (for example, PTLs 2 to 5).

CITATION LIST

Patent Literature

[PTL 1] Japanese Unexamined Patent Application Publication No. 2012-221754
[PTL 2] Japanese Unexamined Patent Application Publication No. 2003-173777
[PTL 3] Japanese Unexamined Patent Application Publication No. 2005-093192
[PTL 4] Japanese Unexamined Patent Application Publication No. 2005-135925
[PTL 5] Japanese Unexamined Patent Application Publication No. 2013-235682

SUMMARY OF THE INVENTION

While the electricity storage device of PTL 1 is advantageous in terms of enhancing the stability of charge-discharge cycle characteristics, the negative electrode has a high resistance. A low-resistance negative electrode is desirable. PTLs 2 to 5 do not take account of using a layered structure as the active material of an electrode. It is desired to enhance the charge-discharge characteristics of the electrode in which a layered structure is used as the electrode active material.

Accordingly, the present disclosure is made to address such issues, and a major object of the disclosure is to provide an electrode active material using a layered structure, capable of enhancing the charge-discharge characteristics of an electrode, an electrode for an electricity storage device, an electricity storage device, and a method for producing the electrode active material.

The present inventors have conducted intensive research for accomplishing the object and come up with the present invention through the findings that a process of forming a layered structure of an aromatic dicarboxylic acid metal salt by spray drying enables the electrode resistance to decrease and the discharge capacity to increase.

According to an aspect of the present disclosure, an electrode active material for an electricity storage device is provided. The electrode active material includes: a layered structure including an organic framework layer containing aromatic dicarboxylic acid anions and an alkali metal element layer containing alkali metal element coordinated by oxygen atoms of the carboxy moieties in the organic framework layer to form a framework.

The electrode active material is in the form of a hollow sphere structure surrounding aggregates of flakes of the layered structure.

According to another aspect of the present disclosure, an electrode for an electricity storage device is provided. The electrode contains the foregoing electrode active material and has an X-ray diffraction profile in which the peak intensity of the (300) plane is at least twice the peak intensity of the (111) plane.

According to a further aspect of the present disclosure, an electricity storage device includes:
a negative electrode that is the above-described electrode for an electricity storage device;
a positive electrode containing a positive electrode active material; and
an ion conducting medium disposed between the positive electrode and the negative electrode and capable of conducting carrier ions.

The present disclosure further provides a method for producing an electrode active material for an electricity storage device. The method includes:
spray-drying a solution prepared by containing aromatic dicarboxylic acid anions and alkali metal cations by using a spray-drying apparatus, thereby depositing an electrode active material including a layered structure including an organic framework layer containing the aromatic dicarboxylic acid anions and an alkali metal element layer containing alkali metal element coordinated by oxygen atoms of the carboxy moieties to form a framework. The electrode active material is in the form of a hollow sphere structure surrounding aggregates of flakes of the layered structure.

In the electrode active material, the electrode for an electricity storage device, the electricity storage device, and the method for producing the electrode active material that are disclosed herein, the electrode active material including a layered structure acts to further enhance charge-discharge characteristics. The reason is probably as follows: It has been known that, for example, a layered structure of an aromatic dicarboxylic acid dialkali metal salt may be formed by a solution-mixing method of dissolving an aromatic dicarboxylic acid and an alkali metal in a solvent and removing the solvent. The active material prepared by this method can be used in an electrode, and the active material in the electrode is in the form of secondary aggregates. Consequently, the portions of the active material inside the aggregates do not sufficiently form interfaces with the electrolyte, reducing effective reaction interfaces. This causes the internal resistance to increase. In the present disclosure, on the other hand, an active material in the form of particles is formed by spray-drying a solution in which an aromatic dicarboxylic acid and an alkali metal are dissolved by using a spray dryer (spray drying method). The active material produced by this method is in the form of hollow particles surrounding aggregates of flakes of a layered structure and is easy to crush. Accordingly, it is assumed that aggregation of the layered structure is reduced and the primary particles thereof can be highly dispersed in the electrode, reducing internal resistance.

Figure 1:
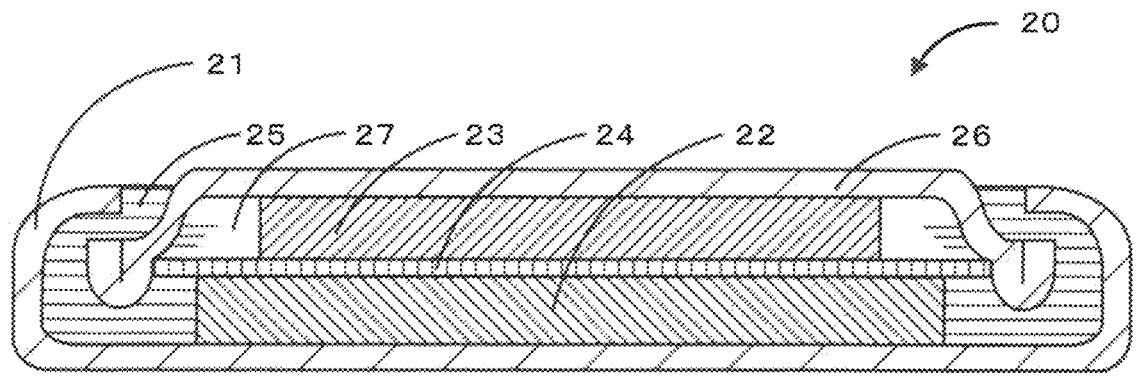
FIG. 1 illustrates a schematic view of an example of an electricity storage device 20.

DETAILED DESCRIPTION OF THE INVENTION (Electrode Active Material)

The electrode active material disclosed herein is intended for use in an electricity storage device. The electrode active material occludes and releases metal ions that are carriers. Preferably, the metal ion, or carrier, is an alkali metal ion and may be at least one of Li ion, Na ion, and K ion, and other alkali metal ions. The electrode active material includes a layered structure including an organic framework layer containing aromatic dicarboxylic acid anions and an alkali metal element layer containing alkali metal element coordinated by oxygen atoms of the carboxy moieties in the organic framework layer to form a framework. Also, the electrode active material is in the form of a hollow sphere structure surrounding aggregates of flakes of the layered structure (see FIGS. 2A and 2B, which will be described herein later). In the hollow sphere structure of the electrode active material, the flakes of the layered structure may extend irregularly toward the outer side of the sphere from the center. Alternatively, in the hollow sphere structure, the flakes of the layered structure may extend irregularly toward the center of the sphere from the outer side. The electrode active material in the form of such a hollow sphere structure can be formed by spray-drying a solution containing aromatic dicarboxylic acid anions and alkali metal cations. The hollow sphere structure may have a diameter of 10 μm or less. Also, the diameter of the hollow sphere structure may be 0.1 μm or more. The particle size of the hollow particles of the layered structure formed by the spray-drying method is in the range of 0.1 μm to 10 μm.

The layered structure may have an organic framework layer formed by an aromatic ring structure or a chain of two or more aromatic ring structures. It is preferable in terms of structural stability that the layers of the layered structure be formed by the π-electron interaction of the aromatic compound and have a monoclinic crystal structure belonging to space group $P2_1/c$. The layered structure may have at least one of the structures represented by formulas (1) to (3). In formulas (1) to (3), a represents an integer of 1 to 5, and b represents an integer of 0 to 3. These aromatic compounds may have a substituent or a heteroatom in the structure thereof. Specifically, any hydrogen of the aromatic compound may be substituted with a halogen, a chain or cyclic alkyl group, an aryl group, an alkenyl group, an alkoxy group, an aryloxy group, a sulfonyl group, an amino group, a cyano group, a carbonyl group, an acyl group, an amide group, and an hydroxy group, or any carbon of the aromatic compound may be replaced with nitrogen, sulfur, or oxygen. More specifically, the layered structure may be one of the aromatic compounds represented by formulas (4) to (6) In formulas (1) to (6), A represents an alkali metal. Preferably, the layered structure has the molecular structure represented by formula (7) in which four oxygen atoms of different dicarboxylic acid anions and the alkali metal element form a tetracoordination in terms of structural stability. In formula (7), R represents one or more aromatic ring structures, and two or more of the plurality of R's may be the same or one or more of the plurality of R's may be different from the others. Also, A represents an alkali metal. It is preferable that the organic framework layers of the layered structure be connected to each other by the alkali metal element.

[Chem. 1]

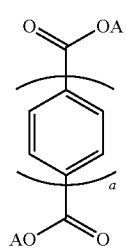

Formula (1)

-continued

Formula (2)

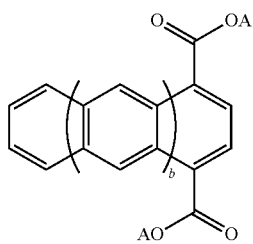

Formula (3)

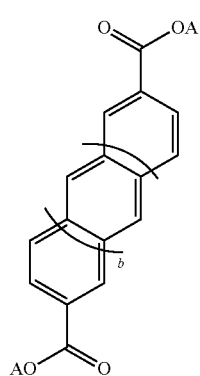

(a represents an integer of 1 to 5, b represents an integer of 0 to 3, and these aromatic compounds may have a substituent or a heteroatom in the molecular structure thereof. A represents an alkali metal.)

[Chem. 2]

Formula (4)

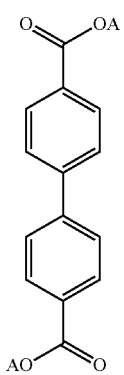

Formula (5)

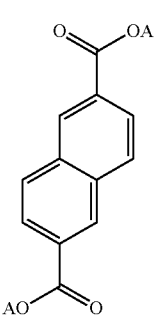

Formula (6)

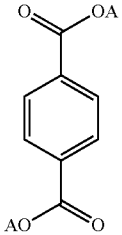

(A represents an alkali metal)

[Chem. 3]

Formula (7)

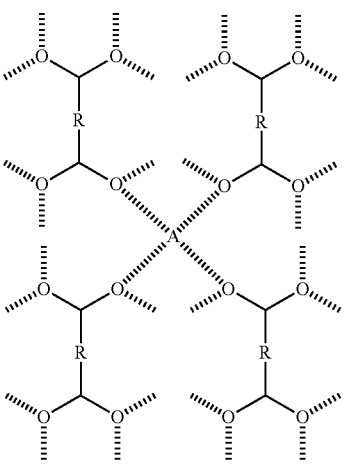

R represents one or multiple aromatic ring structures, and two or more of the R's may be the same or one or more of the R's may be different from the others. A represents an alkali metal.

If the organic framework layer of the layered structure has two or more aromatic ring structures, the compound forming the organic framework layer may be a polycyclic aromatic compound in which two or more aromatic rings are connected to each other, such as biphenyl, or a condensed polycyclic compound in which two or more aromatic rings are condensed, such as naphthalene, anthracene, or pyrene. The aromatic ring may be a five-membered ring, a six-membered ring, or an eight-membered ring. A six-membered ring is preferred. The number of the aromatic rings is preferably in the range of 2 to 5. The compound containing two or more aromatic rings can easily form a layered structure, and the use of the compound containing five or less aromatic rings increases energy density. The organic framework layer may have a molecular structure in which one or more carboxy anions are bound to the aromatic ring. Preferably, the organic framework layer contains an aromatic compound having a molecular structure in which one of the two carboxy moieties of the dicarboxylic acid anion is bound to the aromatic ring structure at a position diagonally opposite to the position at which the other moiety is bound. One of the carboxy moieties may be bound at the farthest position from the other moiety. If the aromatic ring structure is defined by naphthalene, for example, the diagonally opposite positions are at the 2- and 6-positions.

The alkali metal contained in the alkali metal element layer may be at least one selected from the group consisting of Li, Na, K, and the like and is, preferably, Li. The metal ions acting as carriers of the electricity storage device and occluded into and released from the layered structure by charge and discharge may be different from or the same as the ions of the alkali metal element contained in the alkali metal element layer, and may be ions of, for example, at least one selected from the group consisting of Li, Na, K, and the like. Since the alkali metal element in the alkali metal element layer forms the framework of the layered structure, it is assumed that the alkali metal element is not involved in ion migration accompanying charge and discharge, that is, not occluded or released during charge and discharge. In an energy storage mechanism, probably, the organic framework layer of the layered structure functions as a redox (e-) site, whereas the alkali metal element layer functions as a site in which metal ions being carriers are occluded and stored (alkali metal ion-storing site). Preferably, the layered structure is formed of at least one alkali metal salt selected from the group consisting of 2,6-naphthalenedicarboxylic acid alkali metal salts, 4,4'-biphenyldicarboxylic acid alkali metal salts, and terephthalic acid alkali metal salts.

(Method for Producing Electrode Active Material)

The method of the present disclosure for producing an electrode active material is intended to produce the above-described electrode active material for an electricity storage device. This method may include the step of preparing a solution and the step of deposition. The solution may be prepared separate from this method, and the step of preparing the solution may be omitted.

In the step of preparation, a solution containing aromatic dicarboxylic acid anions and alkali metal cations is prepared. The solvent in this solution may be, but is not limited to, an aqueous solvent or an organic solvent, and is preferably water. The concentration of the aromatic dicarboxylic acid anions of the solution prepared in this step is preferably 0.1 mol/L or more, more preferably 0.2 mol/L or more. Also, the concentration of the aromatic dicarboxylic acid anions of the solution prepared in this step is preferably 5 mol/L or less. The solution with a concentration in such a range is easy to spray and dry in the next step. The aromatic dicarboxylic acid anions used in this step may have a benzene ring, a naphthalene ring, a biphenyl ring, or an organic skeleton extended from the naphthalene skeleton or the biphenyl skeleton. Also, the solution prepared in this step preferably contain cations of at least one alkali metal element selected from the group consisting of lithium, sodium, and potassium. In the solution prepared in this step, the ratio of the moles of the alkali metal cations, B (mol), to the moles of the aromatic dicarboxylic acid anions, A (mol), that is, the B/A mole ratio, is preferably 2.2 or more. Thus, it is advantageous that the alkali metal cations be present excessively from the viewpoint of further reducing the resistance of the electrode for the electricity storage device. The B/A mole ratio may be 2.5 or more. The B/A mole ratio may be 3.0 or less.

In the step of deposition, the solution is spray-dried by using a spray-drying apparatus to deposit the electrode active material in the form of hollow sphere structures surrounding aggregates of flakes of the layered structure. The electrode active material includes a layered structure including an organic framework layer containing aromatic dicarboxylic acid anions and an alkali metal element layer containing alkali metal element coordinated by oxygen atoms of the carboxy moieties in the organic framework layer to form a framework. In the step of deposition, the solution prepared in the above-described step of preparing is used. For spray-drying, a spray-dryer may be used. The spray drying conditions may be appropriately controlled according to the scale of the spray drying apparatus and the amount of the electrode active material to be produced. The drying temperature is preferably in the range of, for example, 100° C. to 200° C. The solvent can be sufficiently removed at a drying temperature of 100° C. or more, and energy consumption can be further reduced at a drying temperature of 200° C. or less. More preferably, the drying temperature is 120° C. or more and 180° C. or less. The rate of solution supply, which depends on the scale of production, may be, for example, in the range of 0.1 L/h to 2 L/h. The nozzle size for spraying the solution, which depends on the scale of production, may be, for example, in the range of 0.5 mm to 5 mm in diameter. The spray-drying thus performed to form a layered structure produces the electrode active material in the form of hollow sphere structures described above, including the layered structure.

(Electrode for Electricity Storage Device)

This electrode contains the above-described electrode active material. The electrode for an electricity storage device, or electricity storage device electrode, may be used as the positive electrode or the negative electrode, depending on the potential of the counter electrode. Since the electrode active material has a potential of about 1.5 V with respect to a lithium metal reference, the electricity storage device electrode is advantageously used as a negative electrode. The electricity storage device electrode may be produced as follows. The layered structure being the above-described electrode active material, an electrically conductive material, and a binder are mixed, and an appropriate solvent is further added to the mixture to prepare a paste of electrode material mixture. The paste is applied onto the surface of a current collector, followed by drying. The dried paste may be compressed to increase the density of the electrode, if necessary. Preferably, the electricity storage device electrode contains the above-described electrode active material with as high a proportion as possible. For example, the content of the electrode active material in the electrode material mixture may be in the range of 60% by mass to 95% by mass. The electrically conductive material may be, for example, one of the conductive materials including natural graphite (scaly graphite, flaky graphite), artificial graphite, acetylene black, carbon black, Ketjen black, carbon whisker, needle coke, carbon fiber, and metals (copper, nickel, aluminum, silver, gold, etc.) or a mixture of two or more of these materials. Among these electrically conductive materials, carbon black and acetylene black are preferred in terms of electronic conductivity and easy application. The binder functions to join and hold the particles of the active material and the particles of the electrically conductive material and may be selected from the group consisting of fluororesins including polytetrafluoroethylene (PTFE), polyvinylidene fluoride (PVdF) and fluoro rubber, thermoplastic resins including polypropylene and polyethylene, ethylene propylene diene monomer (EPDM) rubber, sulfonated EPDM rubber, natural butyl rubber (NBR), and the like. The binder resin may be a mixture of two or more of these materials. An aqueous cellulose binder, a dispersion of styrene-butadiene rubber (SBR) in water, or the like may be used. For application, the electrode material mixture may be applied and formed into a desired shape with a desired thickness by, for example, roller coating using applicator rolls or the like, screen coating, a doctor blade method, spin coating, or coating using a bar coater. The current collector may be made of aluminum, titanium, stainless steel, nickel, iron, calcined carbon, electroconductive polymer, electroconductive glass, or the like. The current collector may be in the form of a foil, a film, a sheet, a net, a punched or expanded shape, or a lath or in a porous form, a foamed form, or a fiber compact. The thickness of the current collector may be, for example, 1 μm to 500 μm.

The electricity storage device electrode exhibits an X-ray diffraction profile having a (111) peak with an intensity P(111) and a (300) peak with an intensity P(300). The ratio p(300)/P(111) of the (300) peak intensity to the (111) peak intensity is preferably 2.0 or more. Hence, the (300) peak intensity may be twice or more the (111) peak intensity. More preferably, this peak intensity ratio may be 2.5 or more, still more preferably 3.0 or more. This peak intensity ratio may be 5.0 or less. When this peak intensity ratio is in such a range, the layered structure has an interlayer spacing or the like favorable for reducing the resistance of the electrode. Also, the electricity storage device electrode exhibits a (011) peak with an intensity P(011) when subjected to X-ray diffraction. The ratio p(300)/P(011) of the (300) peak intensity to the (011) peak intensity is preferably 2.0 or more. Hence, the (300) peak intensity may be twice or more the (011) peak intensity. More preferably, this peak intensity ratio may be 2.5 or more, still more preferably 3.0 or more. This peak intensity ratio may be 5.0 or less. When this peak intensity ratio is in such a range, the layered structure has an interlayer spacing or the like favorable for reducing the resistance of the electrode. Also, the electricity storage device electrode exhibits a (100) peak with an intensity P(100) when subjected to X-ray diffraction. The ratio p(100)/P(111) of the (100) peak intensity to the (111) peak intensity is preferably 6.0 or more. Hence, the (100) peak intensity may be 6 times or more the (111) peak intensity. More preferably, this peak intensity ratio may be 6.5 or more, still more preferably 6.6 or more. This peak intensity ratio may be 10.0 or less. When this peak intensity ratio is in such a range, the layered structure has an interlayer spacing or the like favorable for reducing the resistance of the electrode. Furthermore, in an X-ray diffraction of the electricity storage device electrode, the peak intensity ratio p(100)/P(011) of the (100) peak intensity to the (011) peak intensity is preferably 5.0 or more. Hence, the (100) peak intensity may be 5 times or more the (011) peak intensity. More preferably, this peak intensity ratio may be 6.0 or more, still more preferably 6.5 or more. This peak intensity ratio may be 10.0 or less. When this peak intensity ratio is in such a range, the layered structure has an interlayer spacing or the like favorable for reducing the resistance of the electrode. Furthermore, in an X-ray diffraction of the electricity storage device electrode, the peak intensity ratio p(100)/P(300) of the (100) peak intensity to the (300) peak intensity is preferably 1.5 or more. Hence, the (100) peak intensity may be 1 time or more the (300) peak intensity. More preferably, this peak intensity ratio may be 1.8 or more, still more preferably 2.0 or more. This peak intensity ratio may be 5.0 or less. When this peak intensity ratio is in such a range, the layered structure has an interlayer spacing or the like favorable for reducing the resistance of the electrode. Also, when subjected to an X-ray diffraction, the electricity storage device electrode exhibits a unique orientation of small flakes of the active material within the electrode and an increasing tendency of peak intensities corresponding to n00 planes. When observed under a scanning electron microscope, the surface of the electricity storage device electrode may be smooth. The electrode active material is easy to crush into flakes, and the flake can be highly dispersed in the electrode. Accordingly, the electrode has a smooth surface.

(Electricity Storage Device)

The electricity storage device may be, for example, an electric double-layer capacitor, a hybrid capacitor, an electric double-layer pseudocapacitor, a lithium ion battery, or the like. The electricity storage device includes a positive electrode containing a positive electrode active material, a negative electrode containing a negative electrode active material, and an ion conducting medium. The positive electrode may contain a positive electrode active material that occludes and releases carrier ions. The negative electrode may be an electricity storage device electrode containing the above-described electrode active material that is the layered structure capable of occluding and releasing metal ions acting as carriers. The ion conducting medium is disposed between the positive electrode and the negative electrode and conducts carrier ions (cations and anions).

The positive electrode of the electricity storage device may be a known positive electrode used in a capacitor, a lithium-ion capacitor, or the like. The positive electrode may contain, for example, a carbon material as the positive electrode active material. Examples of the carbon material include, but are not limited to, active carbons, cokes, glassy carbons, graphites, non-graphitizable carbons, pyrolytic carbons, carbon fibers, carbon nanotubes, and polyacenes. Active carbons, which have a high specific surface area, are advantageous. The active carbon used as the carbon material preferably has a specific surface area of 1000 $m^2/g$ or more, more preferably 1500 $m^2/g$ or more. When the specific surface area is 1000 $m^2/g$ or more, the discharge capacity can be increased. The specific surface area of the active carbon is preferably 3000 $m^2/g$ or less, more preferably 2000 $m^2/g$ or less, in view of ease of production. The positive electrode may adsorb and desorb at least either anions or cations from the ion conducting medium to store electricity, and may further allow either the anions or the cations in the ion conducting medium to be penetrated and released, thus storing electricity.

Alternatively, the positive electrode may be a positive electrode used in general lithium ion batteries. In this instance, a sulfide containing a transition metal element, an oxide containing lithium and a transition metal element, or the like may be used as the positive electrode active material. More specifically, examples of the positive electrode active material include transition metal sulfides, such as $TiS_2$, $TiS_3$, $MoS_3$, or $FeS_2$; lithium manganese composite oxides having a basic composition represented by $Li_{(1-x)}MnO_2$ (e.g. $0<x<1$, the same applies to the following), $Li_{(1-x)}Mn_2O_4$, or the like; lithium cobalt composite oxides having a basic composition represented by $Li_{(1-x)}CoO_2$ or the like; lithium nickel composite oxides having a basic composition represented by $Li_{(1-x)}NiO_2$ or the like; lithium nickel cobalt manganese composite oxides having a basic composition represented by $Li_{(1-x)}Ni_aCo_bMn_cO_2$ (a+b+c=1); lithium vanadium composite oxides having a basic composition represented by $LiV_2O_3$ or the like; and transition metal oxides having a basic composition represented by $V_2O_5$ or the like. The positive electrode active material may be lithium iron phosphate or the like. Preferably, lithium transition metal composite oxides, such as $LiCoO_2$, $LiNiO_2$, $LiMnO_2$, and $LiV_2O_3$, are used. The term "basic composition" used herein implies that the material may contain other elements.

The positive electrode may be produced as follows. The positive electrode active material described above, an electrically conductive material, and a binder are mixed, and an appropriate solvent is further added to the mixture to prepare a paste of the positive electrode material mixture. The paste is applied onto the surface of a current collector, followed by drying. The dried paste may be compressed to increase the density of the electrode, if necessary. The electrically conductive material, the binder, the solvent, and the current collector used in the positive electrode each may be appropriately selected from those cited as the material of the negative electrode.

The ion conducting medium of the electricity storage device concerned may be, for example, a non-aqueous electrolyte containing a supporting salt (supporting electrolyte) and an organic solvent. If the carriers are lithium ions, the supporting salt may contain a known lithium salt. Examples of the lithium salt include $LiPF_6$, $LiBF_4$, $LiClO_4$, $LiAsF_6$, $Li(CF_3SO_2)_2N$, and $LiN(C_2F_5SO_2)_2$. $LiPF_6$, $LiBF_4$, and the like are preferred. The concentration of the supporting salt in the non-aqueous electrolyte is preferably in the range of 0.1 mol/L to 5 mol/L, more preferably in the range of 0.5 mol/L to 2 mol/L. When the supporting salt is dissolved at a concentration of 0.1 mol/L or more, a sufficient current density can be obtained; when it is dissolved at a concentration of 5 mol/L or less, the electrolyte can be more stabilized. The non-aqueous electrolyte may contain a phosphorus-based or halogen-based flame retardant or any other flame retardant. The organic solvent may be, for example, an aprotic organic solvent. Such an organic solvent may be an cyclic carbonate, a chain carbonate, a cyclic ester, a cyclic ether, a chain ether, or the like. Examples of the cyclic carbonate include ethylene carbonate, propylene carbonate, butylene carbonate, and vinylene carbonate. Examples of the chain carbonate include dimethyl carbonate, diethyl carbonate, and methyl ethyl carbonate. Examples of the cyclic ester carbonate includes gamma-butyrolactone and gamma-valerolactone. Examples of the cyclic ether include tetrahydrofuran and 2-methyltetrahydrofuran. Examples of the chain ether include dimethoxyethane and ethylene glycol dimethyl ether. These and those organic solvents may be used singly or in combination. The non-aqueous electrolyte may be a nitrile-based solvent such as acetonitrile or propionitrile, ionic liquid, or a gel electrolyte.

The electricity storage device may include a separator between the positive electrode and the negative electrode. Any separator may be used without particular limitation as long as it has a composition durable in the range in which the electricity storage device is used. Examples of the separator include polymer nonwoven fabrics, such as polypropylene nonwoven fabrics and polyphenylene sulfide nonwoven fabrics, and microporous resin films of olefins, such as polyethylene and polypropylene. These separators may be used singly or in combination.

The electricity storage device may be in, but is not limited to, the shape of a coin, a button, a sheet, a laminate, or a hollow cylinder, a flat shape, or a rectangular shape. The electricity storage device may be implemented as a large-scale storage device for electric cars or the like. FIG. 1 is a schematic view of an embodiment of the electricity storage device 20. The electricity storage device 20 includes a battery case 21 in the shape of a cup, a positive electrode 22 containing a positive electrode active material and disposed on the lower side of the battery case 21, a negative electrode 23 containing a negative electrode active material and opposing the positive electrode 22 with a separator 24 therebetween, a gasket 25 made of an insulating material and disposed in an opening of the battery case 21, and a sealing plate 26 sealing the battery case 21 with the gasket 25 therebetween. The electricity storage device 20 contains an ion conducting medium 27 filling the space between the positive electrode 22 and the negative electrode 23. The negative electrode 23 contains the layered structure of an aromatic dicarboxylic acid metal salt as the negative electrode active material.

Figure 2:
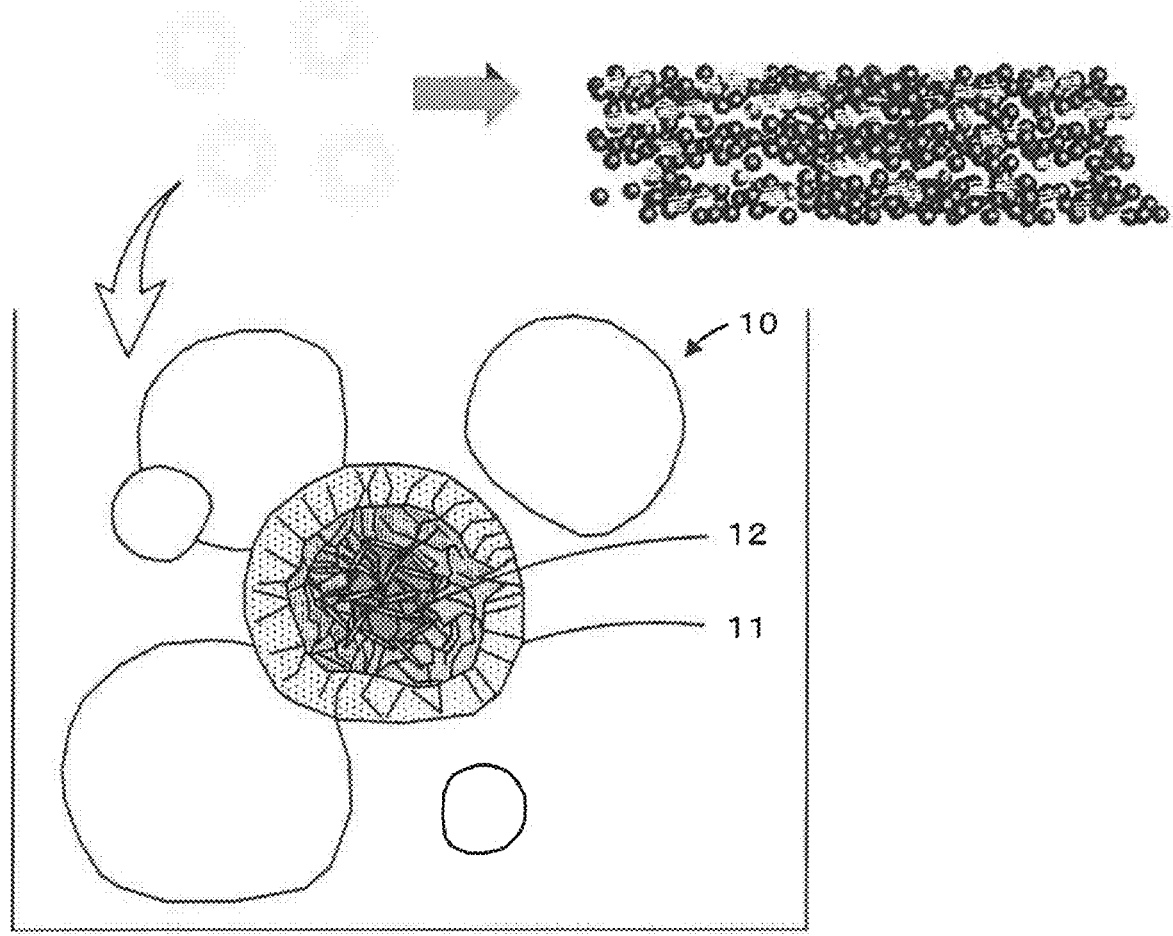
FIGS. 2A and 2B are illustrative representations of active materials and electrodes that are produced by a solution-mixing method or a spray drying method.

In the above-described electrode active material, electricity storage device electrode, electricity storage device, and method for producing the electrode active material, the use of the layered structure as the electrode active material enhances charge-discharge characteristics, such as reducing the resistance of the electrode. The reason is probably as follows: FIGS. 2A and 2B are illustrative representations of active materials and electrodes that are produced by a known solution-mixing method (a) or the spray-drying method (b) disclosed herein. It has been known that, for example, a layered structure may be formed by a solution-mixing method of dissolving an aromatic dicarboxylic acid and an alkali metal in a solvent and removing the solvent. The active material prepared by this method can be used in an electrode. This active material in the electrode is in the form of secondary aggregates. Consequently, the portions of the active material inside the aggregates do not form interfaces sufficiently with the electrolyte, reducing the effective reaction interfaces. This causes the internal resistance to increase. In the present disclosure, on the other hand, an active material in the form of particles is formed by spray-drying a solution in which an aromatic dicarboxylic acid and an alkali metal are dissolved by using a spray dryer (spray-drying method). The electrode active material 10 produced by this method is in the form of hollow particles 11 surrounding aggregates of flakes of a layered structure 12 and is easy to crush. Therefore, the layered structures do not aggregate easily, and the primary particles thereof can be highly dispersed in the electrode. Probably, this is the reason why the internal resistance can be reduced. In the case of using the known electrode active material in the form of secondarily aggregated large particles, the electrode has few interfaces that can receive metal ions (for example, lithium ions) in the electrode, resulting in an insufficient discharge capacity. On the other hand, in the case of using the hollow spherical layered structures in an electrode, the electrode has many interfaces that can receive metal ions, and a large portion of the electrode active material functions effectively, producing a large discharge capacity. Thus, the charge-discharge characteristics can be enhanced.

The present disclosure is not limited to the above-described embodiment, and it should be appreciated that various embodiments can be implemented within the technical scope of the disclosure.

EXAMPLES

Specific examples of the electrode active material and the electricity storage device will now be described. In the Examples, two-electrode cells using metallic lithium as the counter electrode were examined. However, as long as a positive electrode containing any positive electrode active material is used as the counter electrode, the cell can act as an electricity storage device.

Example 1

(Electrode Active Material: Synthesis of Layered Structures of Dilithium 4,4'-Biphenyldicarboxylate)

For synthesis of dilithium 4,4'-biphenyldicarboxylate, 4,4'-biphenyldicarboxylic acid and lithium hydroxide monohydrate ($LiOH.H_2O$) were used as the starting materials. Lithium hydroxide was added to water at a concentration of 0.44 mol/L, followed by stirring to yield an aqueous solution. Subsequently, the aqueous solution was adjusted so that the mole ratio B/A of the moles (B mol) of lithium hydroxide to the moles (A mol) of 4,4'-biphenyldicarboxylic acid would be 2.2, that is, so that the concentration of 4,4'-biphenyldicarboxylic acid would be 0.20 mol/L. The resulting solution was spray-dried by using a spray dryer (Mini Spray Dryer B-290, manufactured by Buchi) to deposit dilithium 4,4'-biphenyldicarboxylate. The solution was sprayed at a rate of 0.4 L/h through a nozzle of 1.4 mm in diameter and dried at a temperature of 150° C. to synthesize dilithium 4,4'-biphenyldicarboxylate.

(Electrode: Preparation of Dilithium 4,4'-Biphenyldicarboxylate Electrode)

A mixture of 79% by mass of the resulting dilithium 4,4'-biphenyldicarboxylate, 14% by mass of carbon black (TB5500, produced by Tokai Carbon., Ltd) as particulate carbon conductive material, 2.8% by mass of polyvinyl alcohol (GOHSENX T-330, produced by The Nippon Synthetic Chemical Industry Co., Ltd.) being a water-soluble polymer, and 4.2% by mass of styrene-butadiene copolymer (BM-400B, produced by Zeon Corporation) was prepared. An appropriate amount of water was added as a dispersant to the mixture, and the mixture was dispersed to yield a slurry of the mixture. The slurry was uniformly applied onto a 10 µm-thick copper foil current collector so that the amount per unit area of dilithium 4,4'-biphenyldicarboxylate active material would be 3 mg/cm$^2$, followed by vacuum-drying at 120° C. to yield a coated sheet. Then, the coated sheet was pressed and punched into a disk-shaped electrode having an area of 2 cm$^2$.

(Electricity Storage Device: Preparation of Two-Electrode Test Cell)

Lithium hexafluorophosphate being a supporting electrolyte was added into a non-aqueous solvent prepared by mixing ethylene carbonate (EC), dimethyl carbonate (DMC), and ethyl methyl carbonate (EMC) with a volume ratio of 30:40:30 at a concentration of 1.0 mol/L to yield a non-aqueous electrolyte. A two-electrode test cell was prepared by placing a separator (manufactured by Toray Battery Separator Film), which was impregnated with the non-aqueous electrolyte, between the above-prepared dilithium 4,4'-biphenyldicarboxylate electrode as the working electrode and a metallic lithium foil (300 µm in thickness) as the counter electrode.

Example 2

The test cell of Example 2 was prepared in the same manner as in Example 1, except that dilithium 4,4'-biphenyldicarboxylate synthesized with a spray dryer was then vacuum-dried at 120° C.

Examples 3 and 4

The test cell of Example 3 was prepared in the same manner as in Example 1, except that the aqueous solution was adjusted so that the mole ratio of lithium hydroxide to 4,4'-biphenyldicarboxylic acid would be 2.5, followed by synthesis with a spray dryer. The test cell of Example 4 was prepared in the same manner as in Example 3, except that dilithium 4,4'-biphenyldicarboxylate synthesized with a spray dryer was then vacuum-dried at 120° C.

Examples 5 to 8

The test cell of Example 5 was prepared in the same manner as in Example 1, except that an non-aqueous electrolyte prepared by adding lithium tetrafluoroborate at a concentration of 1.1 mol/L was used as the supporting electrolyte. The test cell of Example 6 was prepared in the same manner as in Example 2, except that an non-aqueous electrolyte prepared by adding lithium tetrafluoroborate at a concentration of 1.1 mol/L was used as the supporting electrolyte. The test cell of Example 7 was prepared in the same manner as in Example 3, except that an non-aqueous electrolyte prepared by adding lithium tetrafluoroborate at a concentration of 1.1 mol/L was used as the supporting electrolyte. The test cell of Example 8 was prepared in the same manner as in Example 4, except that an non-aqueous electrolyte prepared by adding lithium tetrafluoroborate at a concentration of 1.1 mol/L was used as the supporting electrolyte.

Comparative Example 1

4,4'-Biphenyldicarboxylic acid and lithium hydroxide monohydrate (LiOH.H$_2$O) were used as the starting materials. Methanol (100 mL) was added to lithium hydroxide monohydrate (0.556 g). After stirring, 1.0 g of 4,4'-biphenyldicarboxylic acid was added, followed by stirring for 1 hour. After stirring, the solvent was removed, followed by drying under vacuum at 150° C. for 16 hours to yield white powder of dilithium 4,4'-biphenyldicarboxylate. The test cell of Comparative Example 1 was prepared in the same manner as in Example 1 except for using this white powder.

(SEM Observation)

The electrode active materials prepared in the Examples and Comparative Example were observed under a scanning electron microscope (SEM). For the SEM observation, a scanning electron microscope Quanta 200 FEG (manufactured by FEI) was used at a magnification of 1000 times to 50000 times. A section of each electrode was analyzed for element distribution (oxygen distribution mapping) with an electron beam microanalyzer JXA-8500F (manufactured by JEOL).

(X-Ray Diffraction Analysis)

The electrode active materials and electrodes of Examples 1 to 8 and Comparative Example 1 were subjected to X-ray diffraction. For this analysis, an X-ray diffractometer Ultima IV (manufactured by Rigaku Corporation) was used with CuKα radiation (wavelength: 1.54051 Å). Also, the X-ray radiation was monochromatized with a monocrystalline graphite monochromator, and the applied voltage and the current were set to 40 kV and 30 mA, respectively. The electrode active material and the electrode were measured respectively in the 2θ range of 5° to 60° and in the 2θ range of 5° to 30° at a scanning speed of 5°/min.

(Charge-Discharge Characteristics Test)

The capacity obtained by reducing the two-electrode test cell prepared in each of the Examples and Comparative Example to 0.5 V at 0.1 mA at a temperature of 20° C. was defined as the discharge capacity. Also, the capacity subsequently obtained by oxidizing the test cell to 1.5 V at 0.1 mA was defined as the charge capacity. Also, a differential curve was obtained by calculating differential values of the obtained charge-discharge curve with respect to potential difference. Also, the charge-discharge polarization was calculated by using the difference between two different internal resistive differential peaks in the differential curve, and the IV resistance was calculated in consideration of applied current. The charge-discharge curve of the second cycle was used for calculation of the IV resistance. In addition, each two-electrode test cell was subjected to 10-cycle continuous charge-discharge test at 20° C. under the above conditions for examining the capacity retention rate. The capacity retention rate (%) after the charge-discharge cycle test was defined by Q(10th)/Q(1st)×100, wherein Q(1st) represents the charge capacity in the first charge-discharge operation, and Q(10th) represents the charge capacity in the 10th operation.

(Results and Discussion)

Figure 3:
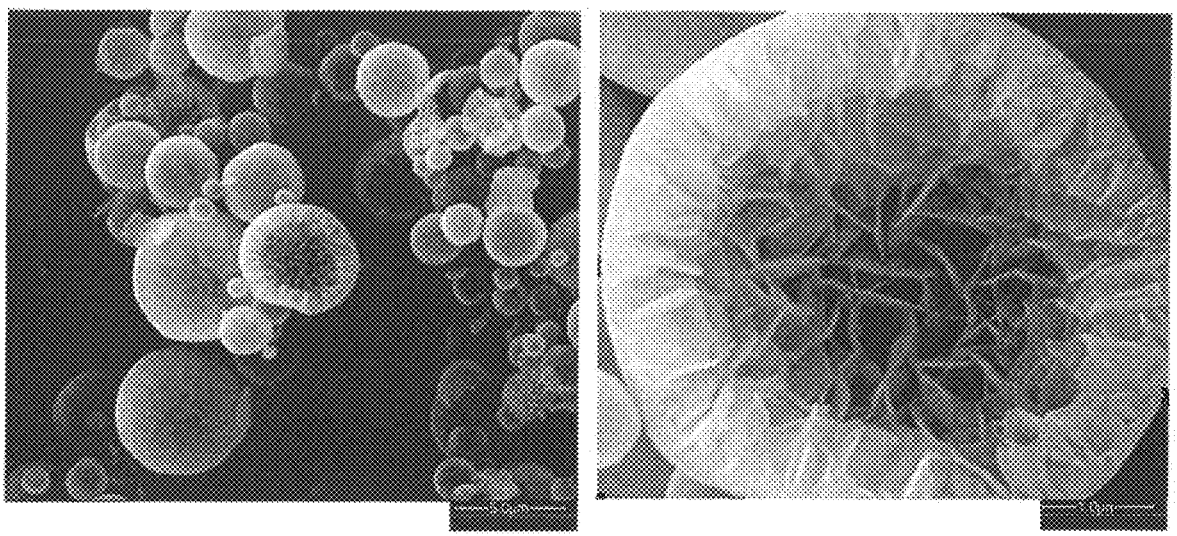
FIG. 3 shows SEM micrographs of Example 1.
Figure 4:
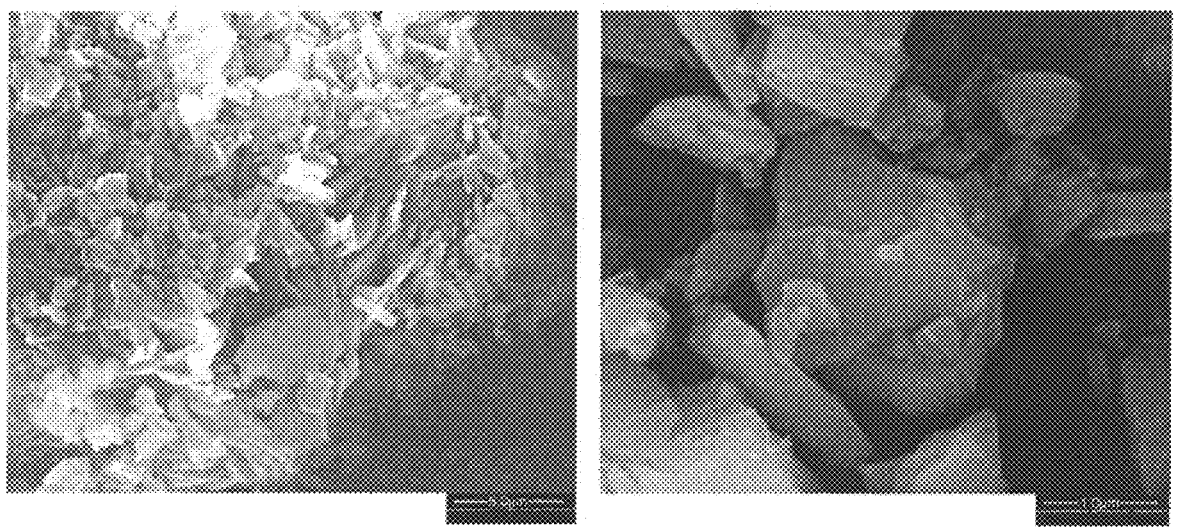
FIG. 4 shows SEM micrographs of Comparative Example 1.
Figure 6:
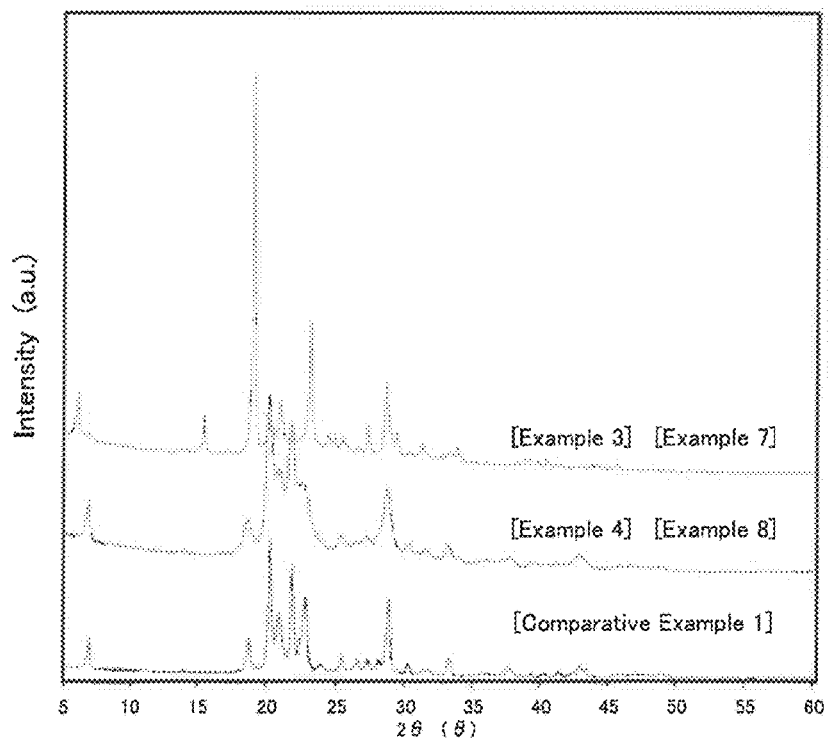
FIG. 6 shows XRD measurement results of the electrode active materials of Examples 3, 4, 7, and 8 and Comparative Example 1.

Table 1 shows details of Examples 1 to 8 and Comparative Example 1: production method, the amount of Li, whether or not the active material was dried, the supporting salt of the secondary battery, IV resistance, resistance ratio with respect to Comparative Example 1, maximum discharge capacity, and capacity retention rate in charge-discharge cycles. FIG. 3 shows SEM micrographs of Example 1. FIG. 4 shows SEM micrographs of Comparative Example 1. As shown in FIG. 4, the electrode active material defined by the layered structures produced by the known solution-mixing method was in a state of an aggregate of particles of 1 µm in particle size. On the other hand, the electrode active material defined by the layered structures of Example 1 produced by the spray drying method was in the form of hollow particles having a particle size of 10 µm or less, as shown in FIG. 3. Also, a magnified particle of the electrode active material whose interior was exposed showed that the layered structure was in the form of a hollow sphere structure surrounding aggregates of flakes of the layered structure. In addition, it was found that the electrode active material had a structure where the flakes of the layered structure extend irregularly toward the outer side of the hollow sphere structure from the center (the same meaning as a structure where the flakes of the layered structure extend irregularly toward the center of the hollow sphere structure from the outer side).

method. Thus, it was found that the active material of Example 1 was changed into the same crystal structure as the active material produced by the known method including drying. Also, FIG. 6 shows that Example 3 in which the mole ratio of lithium hydroxide to 4,4'-biphenyldicarboxylic acid was 2.5 and Example 4 in which the active material of Example 3 was vacuum-dried at 120° C. exhibited similar results to Examples 1 and 2.

Figure 7A:
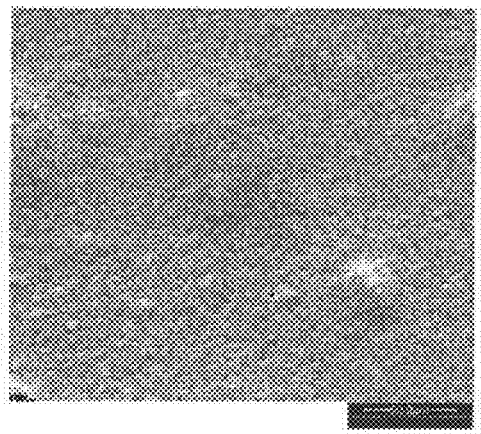
FIGS. 7A to 7E show SEM micrographs of the electrode surfaces of Examples 1 to 8 and Comparative Example 1.
Figure 7B:
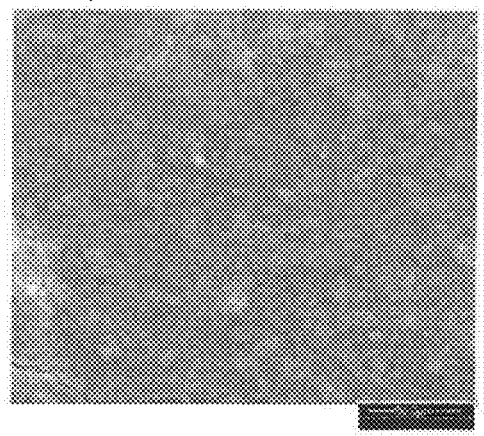
Figure 7C:
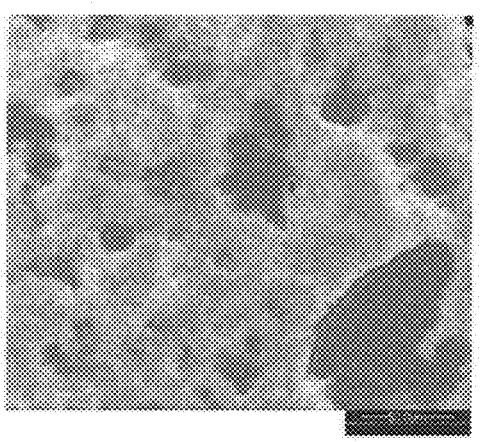
Figure 7D:
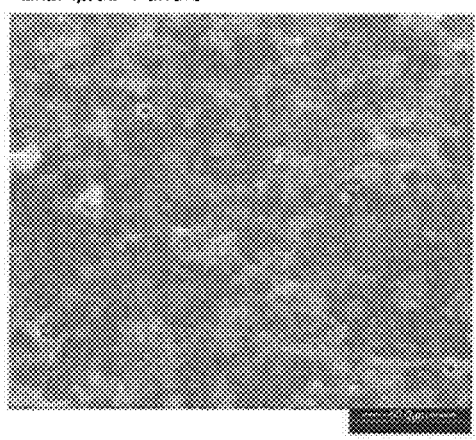
Figure 7E:
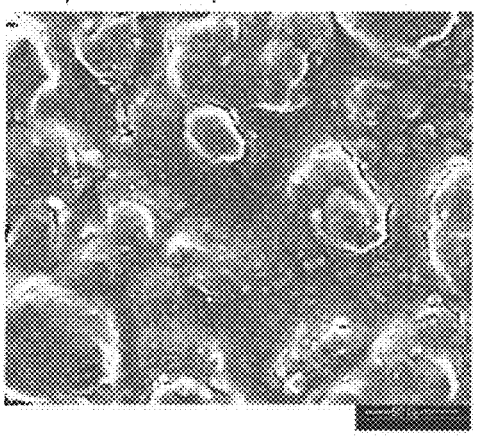

FIG. 7A to 7E show SEM micrographs of the electrode surfaces of Examples 1 to 8 and Comparative Example 1: FIG. 7A shows Examples 1 and 5; FIG. 7B shows Examples 2 and 6; FIG. 7C shows Examples 3 and 7; FIG. 7D shows Examples 4 and 8; and FIG. 7E shows Comparative Example 1. FIG. 7 shows that the electrode formed using the active material of Comparative Example 1 had a rough surface with a large unevenness. The layered structure formed by the solution-mixing method is in the form of an aggregate of large particles, as shown in FIG. 2A, and the aggregate is applied as it is onto a current collector when an electrode is produced. This is probably the reason of the rough surface. On the other hand, the electrodes formed using either the active material of Example 1 or 2 produced by the spray drying had smooth surfaces. This is probably because the hollow particles of flaky layered structures as shown in FIG. 2B are very fragile and are therefore easily crushed and highly dispersed when applied as the electrode material mixture onto a current collector.

Figure 8A:
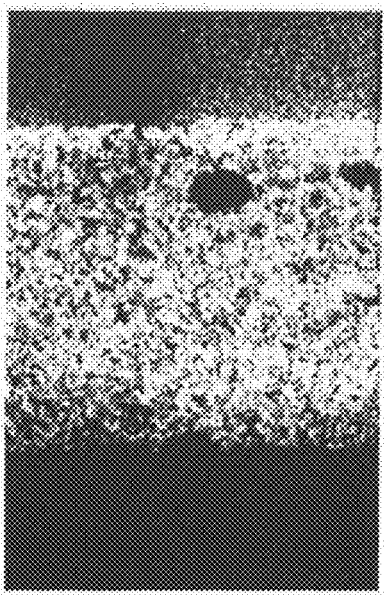
FIGS. 8A to 8C show oxygen distribution maps at a section of electrodes of Examples 1 and 2 and Comparative Example 1.
Figure 8B:
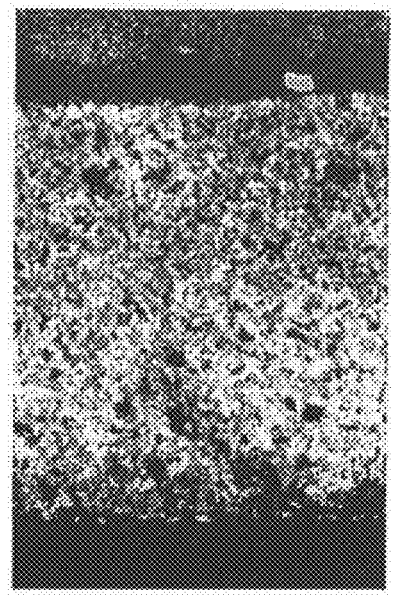
Figure 8C:
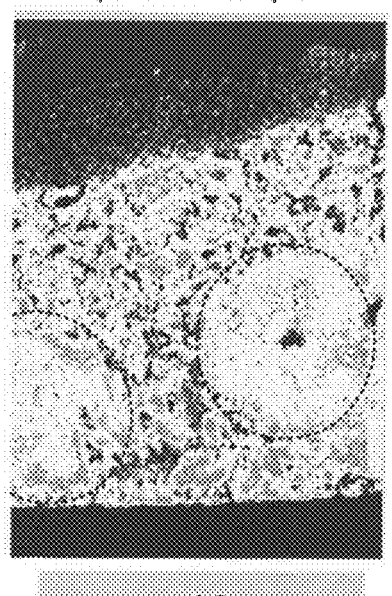

FIG. 8A to 8C show oxygen distribution maps obtained by electron beam microanalysis of a section of each electrode of Examples 1 and 2 and Comparative Example 1: FIG. 8A shows the map of Example 1; FIG. 8B shows the map of Example 2; and FIG. 8C shows the map of Comparative Example 1. The oxygen in the electrode material mixture is

TABLE 1

|  | Electrode active material | | | Electricity storage device | | | |
| --- | --- | --- | --- | --- | --- | --- | --- |
|  | Production method of active material | Equal amount of Li | Drying of active material | Supporting salt | IV resistance Ω | Resistance ratio[1] | Maximum discharge capacity mAh/g | Capacity retention rate in charge-discharge cycle % |
| Example 1 | Spray | 2.2 | Not dried | $LiPF_6$ | 358 | 0.71 | 193.2 | 92.7 |
| Example 2 | drying | 2.2 | Dried | $LiPF_6$ | 345 | 0.68 | 191.0 | 92.3 |
| Example 3 |  | 2.5 | Not dried | $LiPF_6$ | 402 | 0.79 | 152.9 | 92.7 |
| Example 4 |  | 2.5 | Dried | $LiPF_6$ | 300 | 0.59 | 188.3 | 92.6 |
| Example 5 |  | 2.2 | Not dried | $LiBF_4$ | 224 | 0.44 | 197.8 | 92.5 |
| Example 6 |  | 2.2 | Dried | $LiBF_4$ | 262 | 0.52 | 193.2 | 95.7 |
| Example 7 |  | 2.5 | Not dried | $LiBF_4$ | 319 | 0.63 | 167.7 | 91.6 |
| Example 8 |  | 2.5 | Dried | $LiBF_4$ | 303 | 0.60 | 185.7 | 95.7 |
| Comparative Example 1 | Solution-mixing | 2.2 | Dried | $LiPF_6$ | 507 | 1.00 | 162.4 | 93.6 |

[1]Normalized to the value of Comparative Example 1, which is treated as 1.00.

Figure 5:
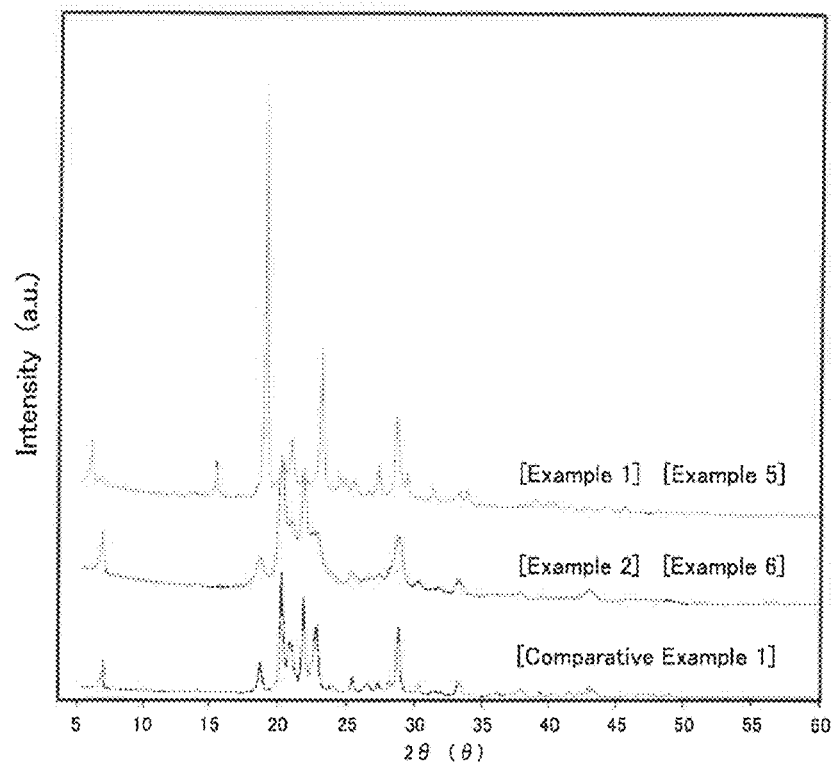
FIG. 5 shows XRD measurement results of the electrode active materials of Examples 1, 2, 5, and 6 and Comparative Example 1.

FIG. 5 shows XRD measurement results of the electrode active materials of Examples 1, 2, 5, and 6 and Comparative Example 1. FIG. 6 shows XRD measurement results of the electrode active materials of Examples 3, 4, 7, and 8 and Comparative Example 1. As shown in FIG. 5, the active material of Example 1, which was produced by the spray drying method using the solution in which the mole ratio of lithium hydroxide to 4,4'-biphenyldicarboxylic acid was 2.2, exhibited an XRD pattern suggesting that the active material has a crystal structure different from the crystal structures of Comparative Example 1 and Example 2 in which the active material was dried. On the other hand, Example 2, in which the particles of the active material of Example 1 were vacuum-dried at 120° C., exhibited peaks at the same 2θ positions as the active material produced by the known derived from the carboxylic acid in the layered structure, and the oxygen distribution corresponds to the distribution of the layered structures. The observation results of electrode sections shown in FIG. 8A to 8C show that in the electrode produced using the active material of Comparative Example 1, oxygen is present at a high concentration at the circumference of large block-like portions (surrounded by dotted lines in the drawing), suggesting that the aggregate of the layered structures formed when the layered structures were formed remained as it was. On the other hand, it was found that the electrodes formed using any of the active materials of Examples 1 to 8 produced by the spray drying were in a state where the active material was uniformly dispersed. Accordingly, it is assumed as follows: when the electrode is produced using the active material prepared by the solution-mixing method, the active material is present in the electrode without being crushed, because of the high cohesion of the active material; the layered structures formed by the spray drying method are in the form of hollow sphere structures formed with flakes and are easy to crush when the electrode is produced, and are thus uniformly dispersed in the state of small flakes in the electrode.

Figure 9:
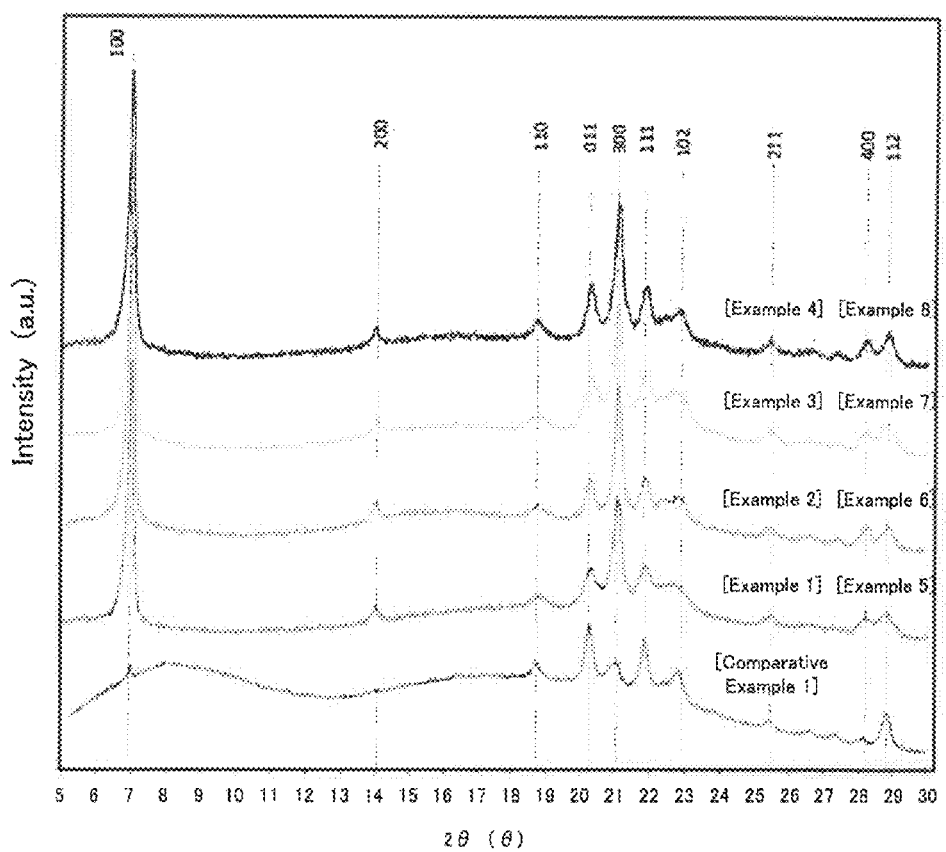
FIG. 9 shows XRD measurement results of the electrodes of Examples 1 to 8 and Comparative Example 1.

FIG. 9 shows XRD measurement results of the electrodes of Examples 1 to 8 and Comparative Example 1. As shown in FIG. 9, the electrodes of Examples 1 to 8 using any of the active materials produced by the spray drying method exhibited peaks at the same 2θ positions as the electrode produced by the known solution-mixing method, irrespective of whether or not the active material was vacuum-dried at 120° C. This is probably because the electrodes were vacuum dried at 120° C., and this vacuum drying produced the same effect as the vacuum drying of the active material at 120° C. For the electrodes produced using any of the active material prepared by the spray drying, the intensity of peaks corresponding to n00 planes tended to increase. This suggests that the flakes of the active material in the electrode have a unique orientation. In particular, in X-ray diffraction of the electrodes of Examples 1 to 8, the (300) peak intensity was twice or more the (111) and the (011) peak intensity; and the (100) peak intensity was five times or more the (111) and the (011) peak intensity.

Figure 10:
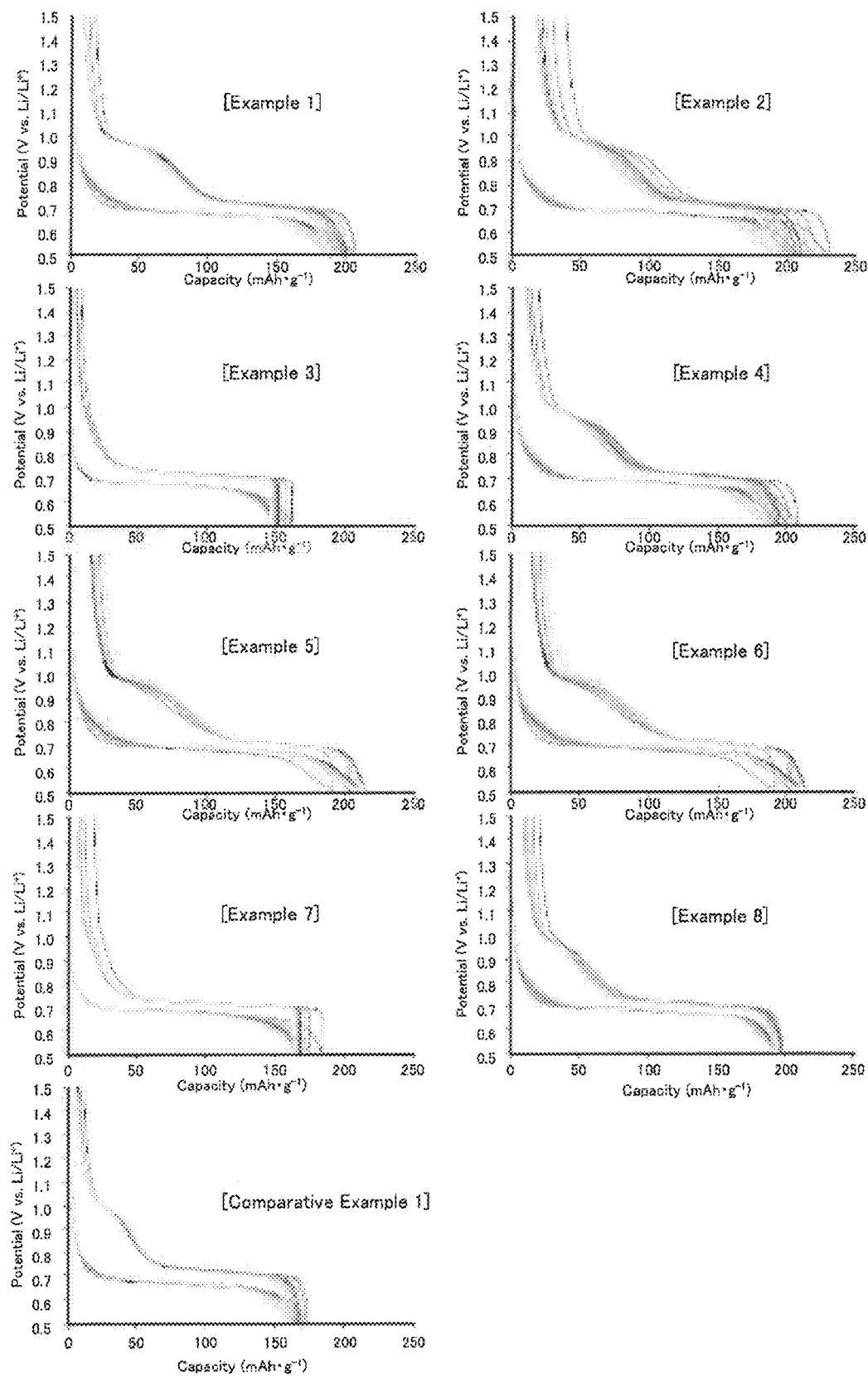
FIG. 10 shows charge-discharge curves of Examples 1 to 8 and Comparative Example 1 in a charge-discharge cycle.
Figure 11:
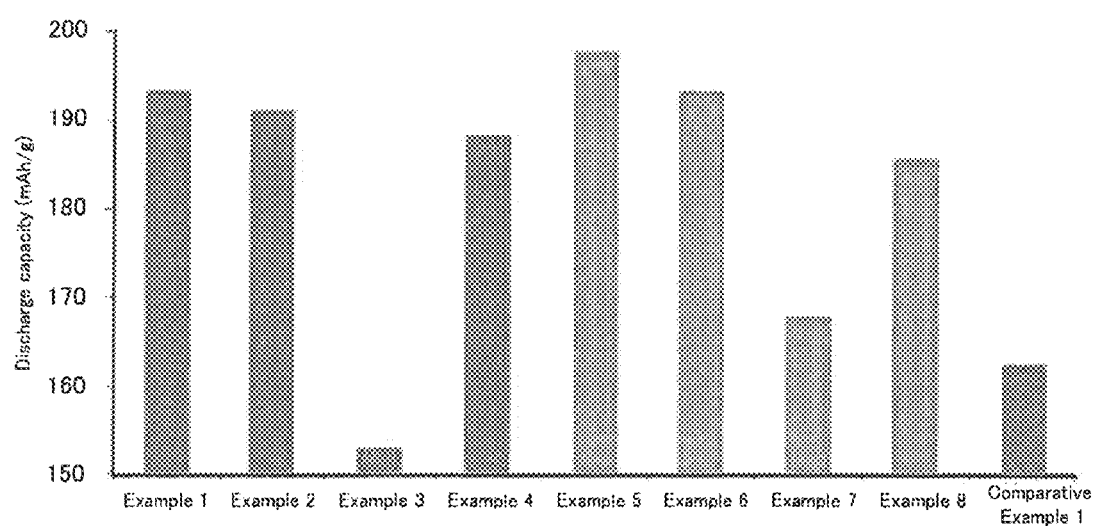
FIG. 11 shows measurement results of discharge capacity of Examples 1 to 8 and Comparative Example 1.

FIG. 10 shows charge-discharge curves of Examples 1 to 8 and Comparative Example 1 in charge-discharge cycles. FIG. 11 shows the evaluation results of the discharge capacity of Examples 1 to 8 and Comparative Example 1. FIG. 10 shows that the electrodes of Examples 1 to 8 using any of the active materials produced by the spray drying method each exhibited a reversible charge-discharge curve. Also, it was found that the reversible charge-discharge capacity increases as shown in FIG. 11 and Table 1. This is probably because the active material is in the form of flakes uniformly dispersed in the electrode, and thus have many interfaces that can be used effectively for charge and discharge, thus increasing utilization and increasing the capacity.

Figure 12:
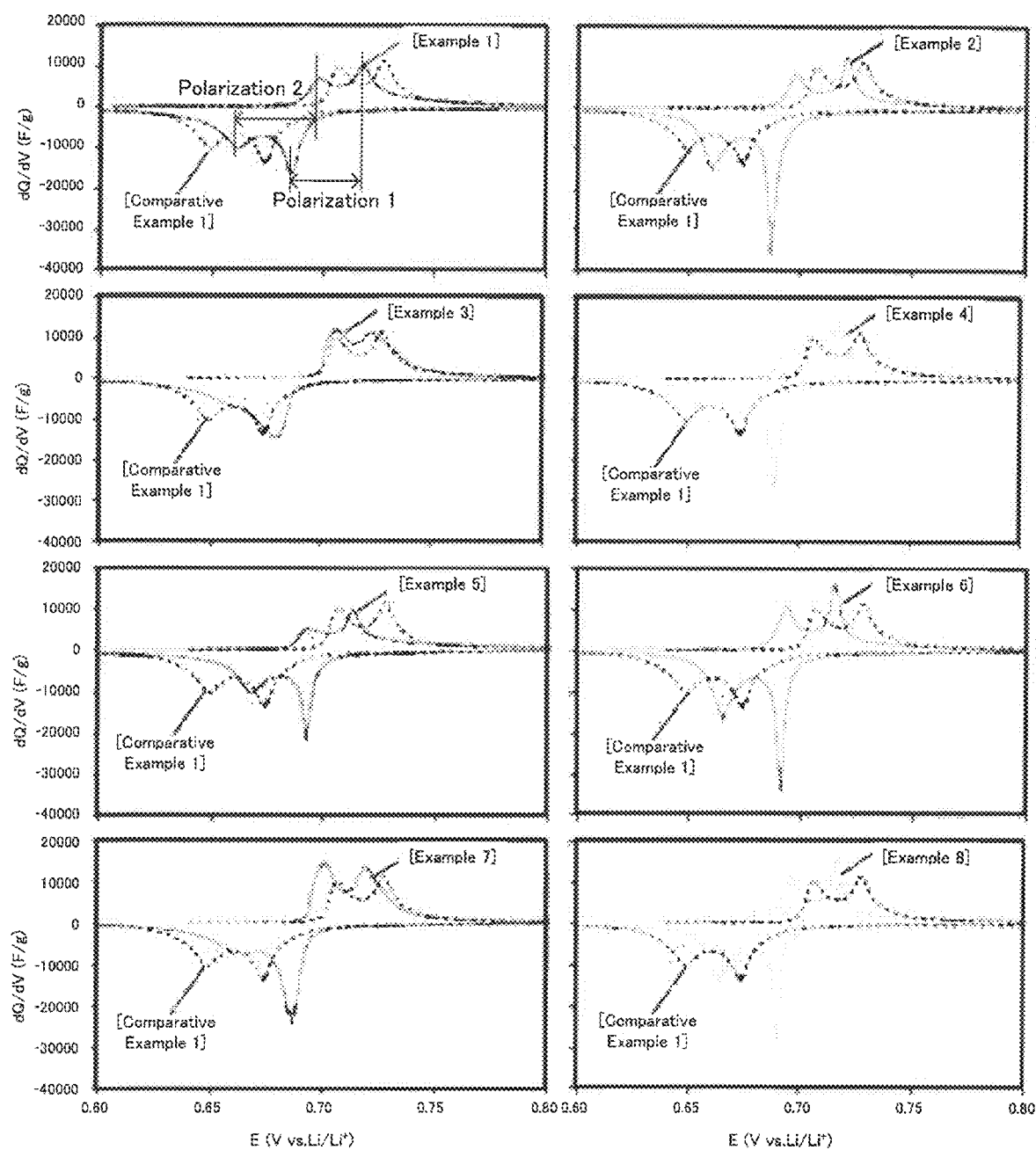
FIG. 12 shows differential curves obtained from the charge-discharge curves of Examples 1 to 8.
Figure 13:
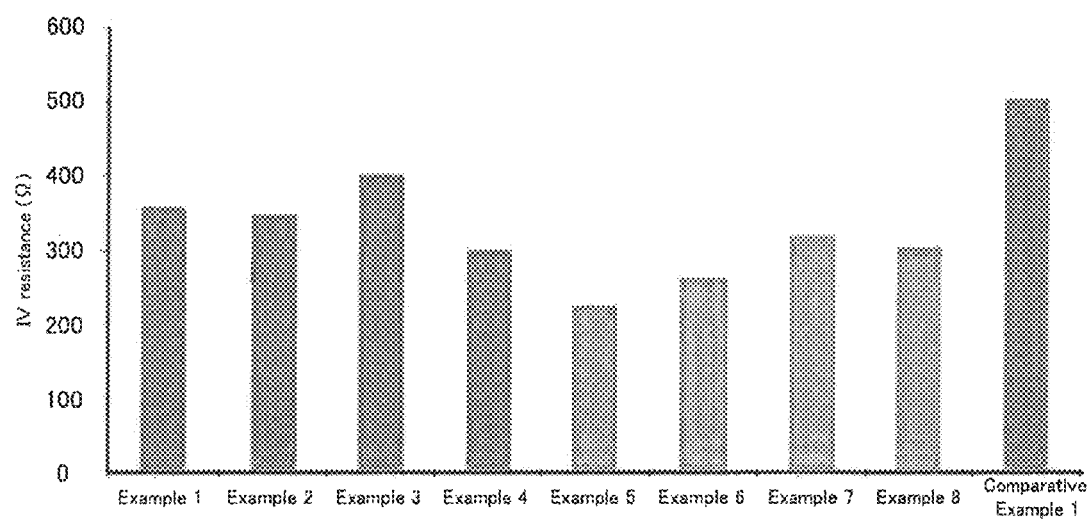
FIG. 13 shows measurement results of IV resistance of Examples 1 to 8 and Comparative Example 1.

The IV resistance was obtained from the differential curve of the charge-discharge curve. FIG. 12 shows differential curves obtained from the charge-discharge curves of Examples 1 to 8. FIG. 13 shows the measurement results of IV resistance of Examples 1 to 8 and Comparative Example 1. dQ/dV was calculated using the results from the charge-discharge curve. Consequently, the electrodes produced using any of the active material prepared by the spray drying method exhibited a small peak potential difference. Also, it was found that the electrodes produced using any of the active materials prepared by the spray drying method has a lower IV resistance than the electrode produced by the active material prepared by the known solution-mixing method, as shown in FIG. 13. This is probably because the active material is in the form of flakes uniformly dispersed in the electrode, and thus have many interfaces that can be used effectively for charge and discharge, thus reducing the resistance.

Figure 14:
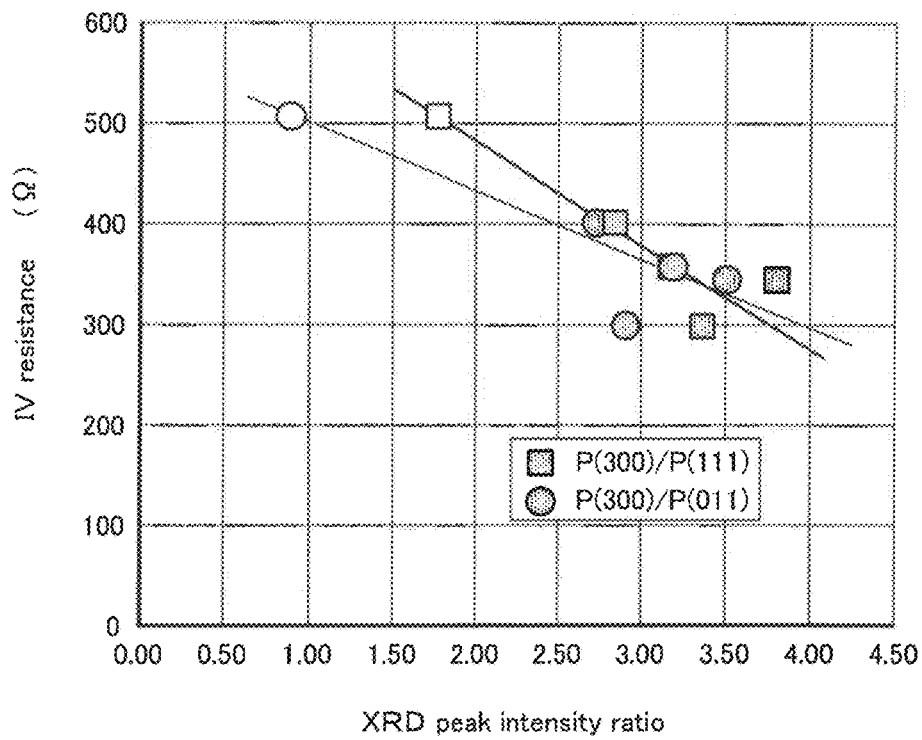
FIG. 14 shows relationships between the IV resistance and each of peak intensity ratios P(300)/P(111) and P(300)/P(011).
Figure 15:
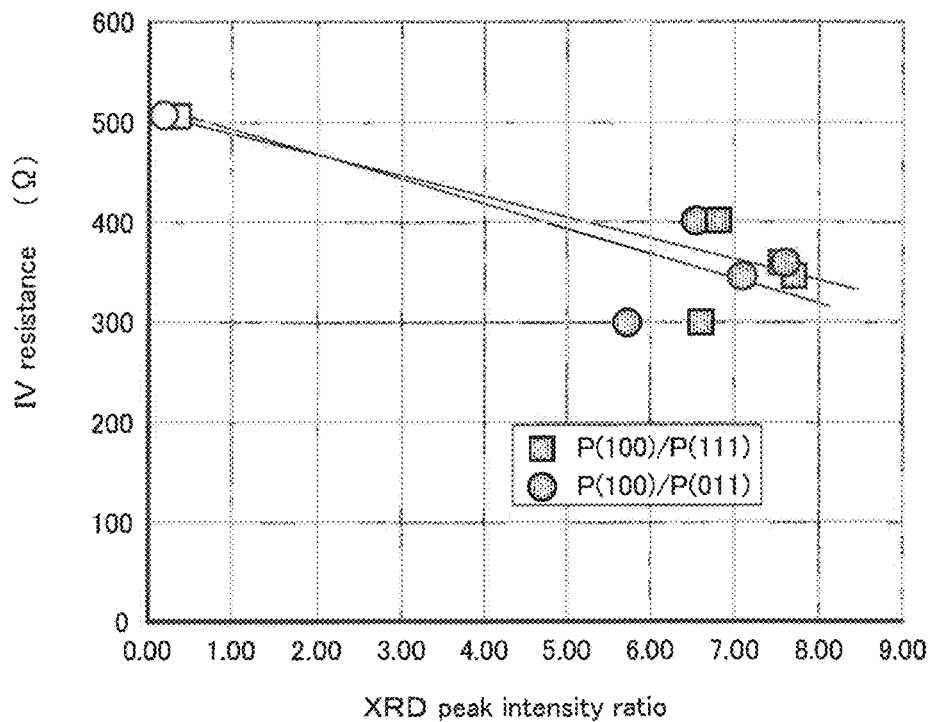
FIG. 15 shows relationships between the IV resistance and each of peak intensity ratios P(100)/P(111) and P(100)/P(011).
Figure 16:
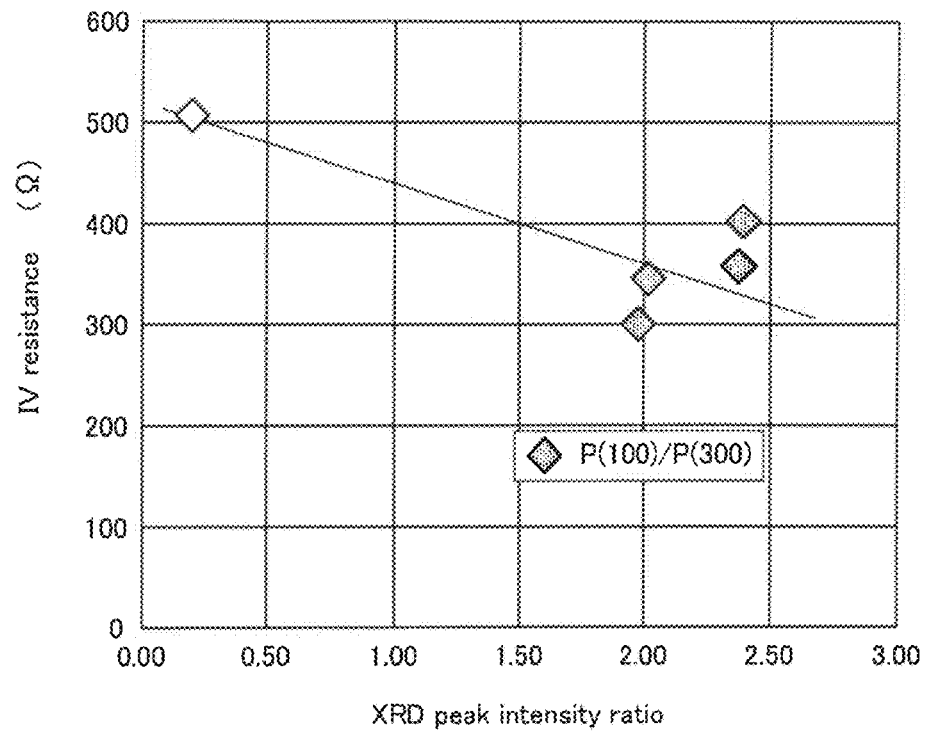
FIG. 16 shows the relationship between the IV resistance and peak intensity ratio P(100)/P(300).
Figure 17:
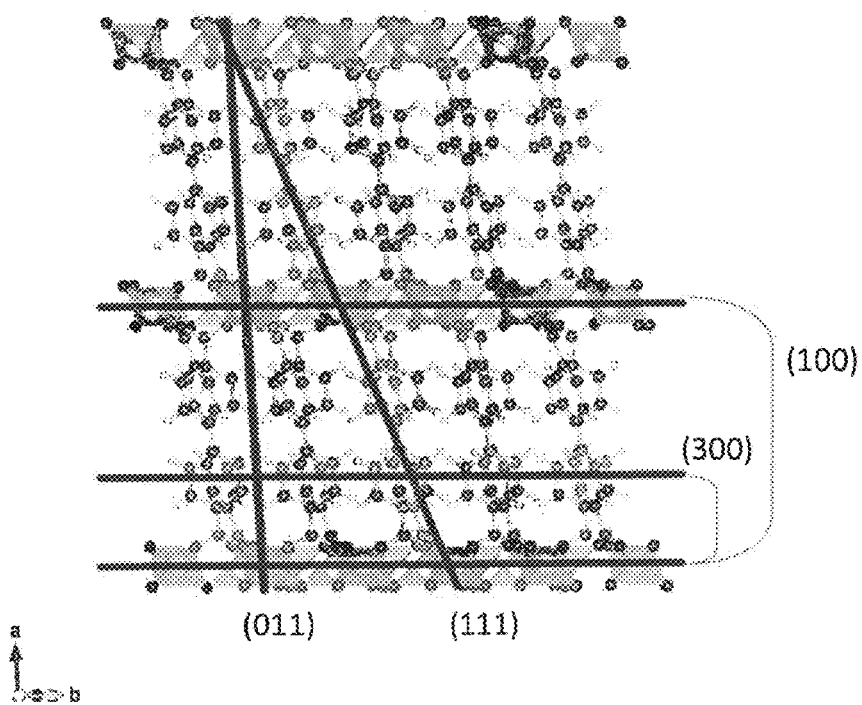
FIG. 17 is an illustrative representation of crystal planes (011), (111), (100), and (300) of a layered structure.

The relationship between the IV resistance and XRD peak intensity ratios was examined. FIG. 14 shows the relationship between the IV resistance and each of the X-ray diffraction peak intensity ratio P(300)/P(111) of the (300) peak intensity to the (111) peak intensity and the peak intensity ratio P(300)/P(011) of the (300) peak intensity to the (011) peak intensity. FIG. 15 shows the relationship between the IV resistance and each of the X-ray diffraction peak intensity ratio P(100)/P(111) of the (100) peak intensity to the (111) peak intensity and the peak intensity ratio P(100)/P(011) of the (100) peak intensity to the (011) peak intensity. FIG. 16 shows the relationship between the IV resistance and the X-ray diffraction peak intensity ratio P(100)/P(300) of the (100) peak intensity to the (300) peak intensity. FIG. 17 is an illustrative representation of crystal planes (011), (111), (100), and (300) of the layered structure. The peak intensity ratios and IV resistance of Comparative Example 1 and Examples 1 to 4 are shown in Table 2 together. FIGS. 14 to 16 show that as peak intensity ratio is increased, IV resistance decreases. Also, it was found that the peak intensity ratios P(300)/P(111) and P(300)/P(011) are preferably 2.0 or more. Also, it was found that the peak intensity ratio P(100)/P(111) is preferably 6.0 or more, and that the peak intensity ratio P(100)/P(011) is preferably 5.0 or more. Also, it was found that the peak intensity ratio P(100)/P(300) is preferably 1.5 or more. As illustrated in FIG. 17, the (100) and (300) planes reflect the crystal planes of the alkali metal element layers of the layered structure, and the (011) and (111) planes reflect the crystal planes of the organic framework layers. It was thus found that in this electrode, higher peak intensities of the crystal planes of the alkali metal element layer are advantageous for enhancing the battery properties, such as reducing the IV resistance.

TABLE 2

|  | XRD peak intensity ratio of electrode | | | | | IV resistance Ω |
| --- | --- | --- | --- | --- | --- | --- |
|  | P(300)/P(111) | P(300)/P(011) | P(100)/P(111) | P(100)/P(011) | P(100)/P(300) |  |
| Comparative Example 1 | 1.77 | 0.89 | 0.35 | 0.18 | 0.20 | 507 |
| Example 1 | 3.18 | 3.20 | 7.54 | 7.60 | 2.38 | 358 |
| Example 2 | 3.81 | 3.51 | 7.70 | 7.09 | 2.02 | 345 |
| Example 3 | 2.85 | 2.73 | 6.83 | 6.54 | 2.40 | 402 |
| Example 4 | 3.37 | 2.91 | 6.61 | 5.72 | 1.98 | 300 |

According to the above-described findings, since an electrode material using the active material disclosed herein produced by the spray drying method comes into a state where the active material is uniformly dispersed in the electrode when the electrode is produced, and thus has many electrochemically active interfaces, the electric resistance of the electrode is greatly reduced, and the utilization is increased.

The present application claims priority on the basis of the Japanese Patent Application No. 2017-62814 filed on Mar. 28, 2017, the entire contents of which are incorporated herein by reference.

What is claimed is:
1. An electrode active material for an electricity storage device, the electrode active material comprising:

a layered structure including an organic framework layer containing aromatic dicarboxylic acid anions, and an alkali metal element layer containing alkali metal element coordinated by oxygen atoms of the carboxy moieties in the organic framework layer to form a framework, wherein the electrode active material is in the form of a hollow sphere structure surrounding aggregates of flakes of the layered structure.

2. The electrode active material according to claim 1, wherein the flakes of the layered structure extend irregularly toward the outer side of the hollow sphere structure from the center of the hollow sphere structure.

3. The electrode active material according to claim 1, wherein the hollow sphere structure has a diameter of 10 μm or less.

4. The electrode active material according to claim 1, wherein the layered structure has at least at least one of the structures represented by formulas (1) to (3):

[Chem. 1]

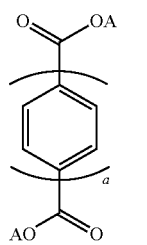

Formula (1)

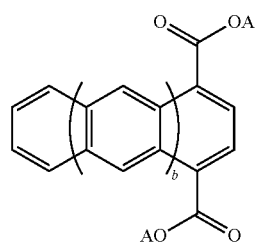

Formula (2)

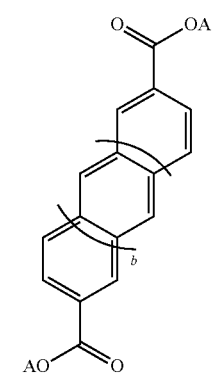

Formula (3)

wherein a represents an integer of 1 to 5, b represents an integer of 0 to 3, and these aromatic compounds of formulas (1) to (3) may have a substituent or a heteroatom in the structure thereof; and A represents an alkali metal.

5. The electrode active material according to claim 1, wherein the layered structure contains cations of at least one alkali metal selected from the group consisting of lithium, sodium, and potassium.

6. An electrode for an electricity storage device, comprising the electrode active material according to claim 1.

7. The electrode according to claim 6, the electrode exhibiting an X-ray diffraction profile satisfying at least one of the following (1) to (5):

(1) the peak intensity ratio P(300)/P(111) of the peak intensity P(300) of the (300) plane to the peak intensity P(111) of the (111) plane is 2.0 or more;

(2) the peak intensity ratio P(300)/P(011) of the peak intensity P(300) of the (300) plane to the peak intensity P(011) of the (011) plane is 2.0 or more;

(3) the peak intensity ratio P(100)/P(111) of the peak intensity P(100) of the (100) plane to the peak intensity P(111) of the (111) plane is 6.0 or more;

(4) the peak intensity ratio P(100)/P(011) of the peak intensity P(100) of the (100) plane to the peak intensity P(011) of the (011) plane is 5.0 or more; and (5) the peak intensity ratio P(100)/P(300) of the peak intensity P(100) of the (100) plane to the peak intensity P(300) of the (300) plane is 1.5 or more.

8. An electricity storage device comprising:

a negative electrode being the electrode according to claim 6;

a positive electrode containing a positive electrode active material; and an ion conducting medium disposed between the positive electrode and the negative electrode, the ion conducting medium capable of conducting carrier ions.

9. The electricity storage device according to claim 8, wherein the positive electrode contains as the positive electrode active material at least one selected from the group consisting of transition metal composite oxides containing lithium and active carbons having a specific surface area of 1000 $m^2/g$ or more.

10. A method for producing an electrode active material for an electricity storage device, the method comprising:

spray-drying a solution prepared by containing aromatic dicarboxylic acid anions and alkali metal cations by using a spray-drying apparatus, thereby depositing an electrode active material including a layered structure including an organic framework layer containing the aromatic dicarboxylic acid anions and an alkali metal element layer containing alkali metal element coordinated by oxygen atoms of the carboxy moieties in the organic framework layer to form a framework, the electrode active material being in the form of a hollow sphere structure surrounding aggregates of flakes of the layered structure.

11. The method for producing an electrode active material according to claim 10, wherein the mole ratio of the alkali metal cations to the aromatic dicarboxylic acid anions is 2.2 or more in the solution prepared in the step of depositing.

12. The method for producing an electrode active material according to claim 10, wherein the concentration of the aromatic dicarboxylic acid anions is 0.1 mol/L or more in the solution prepared in the step of depositing.

13. The method for producing an electrode active material according to claim 10, wherein the aromatic dicarboxylic acid anions have one selected from the group consisting of a benzene ring, a naphthalene ring, a biphenyl ring, and organic skeletons extended from the naphthalene skeleton or the biphenyl skeleton.

14. The method for producing an electrode active material according to claim 10, wherein the alkali metal cations in the solution prepared are cations of at least one alkali metal selected from the group consisting of lithium, sodium, and potassium.

* * * * *